(No Model.) 2 Sheets—Sheet 1.
W. J. McELROY.
TESTING LEAD COVERED CABLES.
No. 284,137. Patented Aug. 28, 1883.
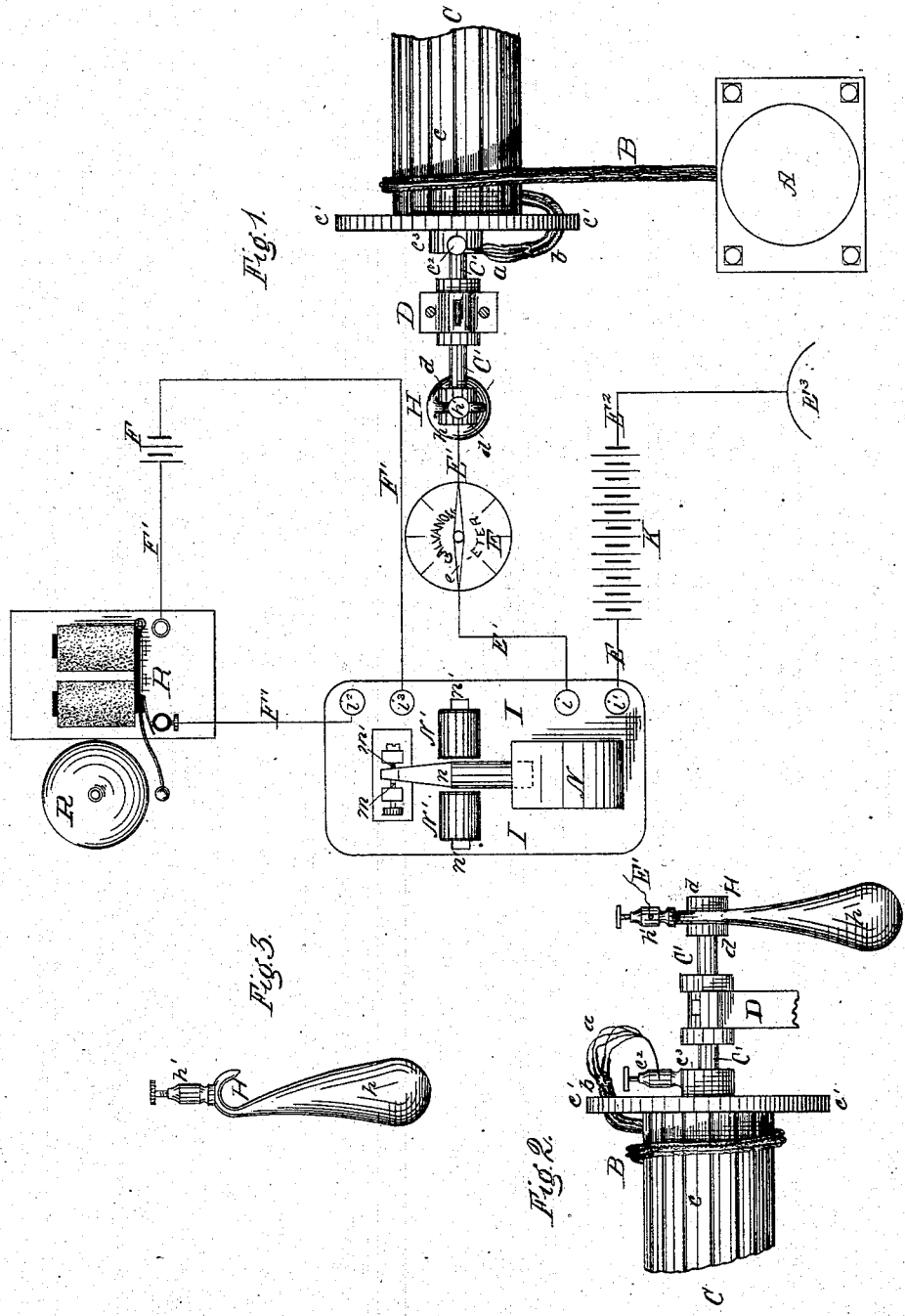

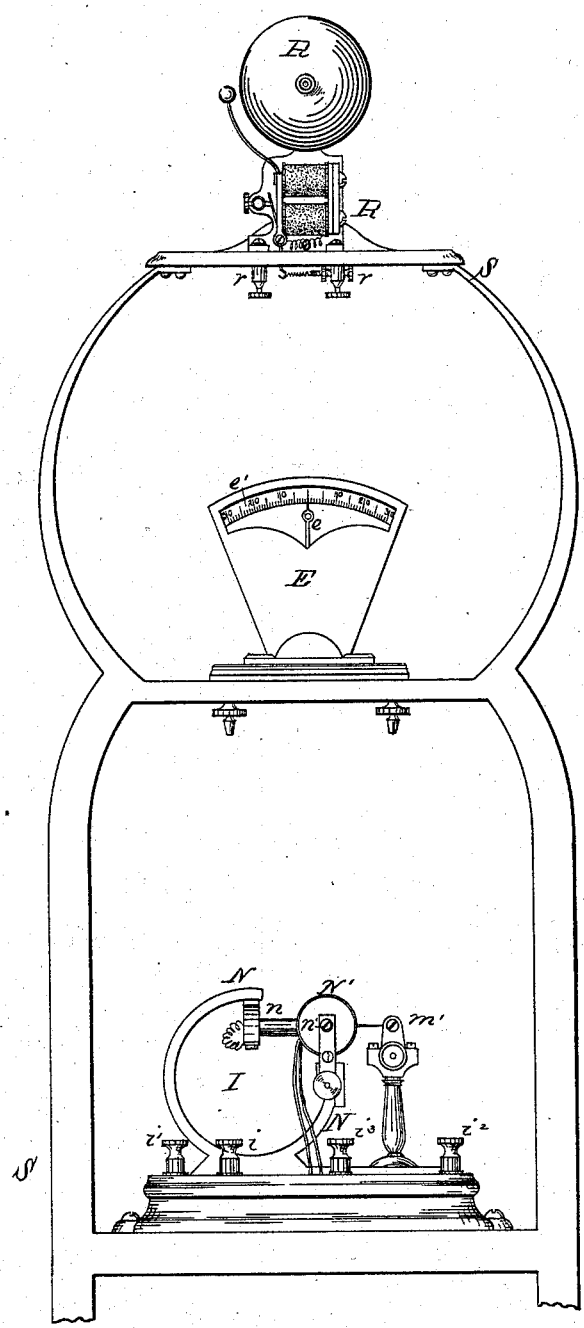

UNITED STATES PATENT OFFICE.

WILLIAM J. McELROY, OF PITTSBURG, PENNSYLVANIA, ASSIGNOR TO THE STANDARD CABLE COMPANY, OF NEW JERSEY.

TESTING LEAD-COVERED CABLES.

SPECIFICATION forming part of Letters Patent No. 284,137, dated August 28, 1883.

Application filed January 22, 1883. (No model.)

*To all whom it may concern:*

Be it known that I, WILLIAM J. MCELROY, of Pittsburg, county of Allegheny, State of Pennsylvania, have invented or discovered a new and useful Improvement in Testing Lead-Covered Cables; and I do hereby declare the following to be a full, clear, concise, and exact description thereof, reference being had to the accompanying drawings, making a part of this specification, in which—like letters indicating like parts—

Figure 1, Sheet 1, is a diagram illustrative of electric apparatus and circuit connections employed in carrying out my invention. Fig. 2 is a view in side elevation of a portion of a reel for coiling the cable and of appliances employed in making circuit-connections with the wires of the cable. Fig. 3 is a view in side elevation of a removable hook employed in making circuit-connection with the shaft of the reel; and Fig. 4, Sheet 2, is a view in side elevation of a stand carrying apparatus adapted for use in working my invention.

My invention relates to certain improvements in apparatus for and in the method or art of testing lead-covered electric cables as the same are being formed in the press; and in general terms it consists in certain combinations with the press and cable, of electric appliances for detecting faults in the insulation of the wires, and in a new and improved method of testing the cable during the operation of applying the heated lead by means of an electric current or state generated or induced within the cable itself by such operation, as hereinafter more fully described and claimed.

In the manufacture of cables of this class, especially such as have two or more insulated conducting-wires inclosed within separate tubular passages in the common body of lead covering, it is desirable to test electrically the wires of the cable as the heated lead covering is applied, in order to prove the perfectness of insulation, or to determine the location of faults by discovering them as soon as formed, thereby enabling the faulty section to be removed without material waste of the perfect cable. In doing this it has been customary heretofore to connect a galvanic battery, one pole to earth and the other to the wires at the end of the cable, with a galvanometer in the line, in order that in case a faulty insulation occurred at any time in any one of the cable-wires, the battery-circuit would be completed through such fault to the lead covering, and thence through the press to ground, thereby exciting or moving the galvanometer-needle and giving ocular signal of the defect. In practice, this method of testing the cable has not proved entirely satisfactory, owing in part to irregular movements of the needle, necessitating very careful watching by a skilled electrician to correctly interpret the various movements which are observed. The cause of the movements, which are continued more or less during the whole operation of forming the cable, have not heretofore been understood, but have been attributed to a supposed temporary reduction or deterioration in the insulation of the wires caused by melting the insulating material under the heat of the lead applied. I have discovered that these disturbing movements are due directly to the existence of an electric current passing over the line, which is excited or developed not in the galvanic battery, but in the cable itself. This current is weak and variable, increasing steadily for a time as the cable first comes from the press, then remains more or less constant until the cable is completed, and then gradually disappears. It is variable, however, directly with changes in temperature in the cable. It is of constant polarity under the ordinary conditions of manufacture, and is capable of exciting magnetism in a helix. It is sensibly active for a time after the cable is severed from the press, and will move a galvanometer-needle if connected in circuit from the wires to the lead covering until the cable is nearly cold.

While I do not wish to limit my present invention by any theory as to the exciting cause or electric character of this current, yet with my present knowledge, judging from the phenomena above described, I believe it to be a thermal current, and ascribe its existence to difference in molecular tension between the lead covering and the insulated conductors, due to difference in temperature.

The insulating material employed in these cables has, by preference, a very high degree of resistance or non-conducting property, both of electricity and of heat; consequently the force or effort to establish equilibrium, generated by such differences in molecular tension, is transmitted through and manifest in the circuit connections, in preference to direct transmission through the insulating substance. Other theories or explanations of the cause of this electric current or state may be entertained, however—for example, that it is in whole or in part due to "static induction," so called, excited or produced by friction or other causes in the application of the lead to the wires within the press, or, perhaps, that it may be due more or less to direct conversion of heat into electricity. It is a marked feature of the current, however, that it increases in strength with an increase in temperature of lead, while friction and power exerted in applying the lead to the wires decreases with such increase in temperature. This relationship and apparent direct dependence induces me to attribute the current or electrical state to thermal causes, as above described. Whatever the source or cause of this electric state or current may be, its presence during the application of lead to the conductors is manifest in the movements of the galvanometer-needle, and introduces material and dangerous elements of uncertainty in testing the cable, unless due provision is made to distinguish with ease and precision between movements due to such thermal current and those due to battery-current, whenever the latter may exist. To this end I determine the polarity of the thermal current by observing the direction of needle movement in the galvanometer caused thereby, and then connect the battery in circuit with polarity opposed to that of the thermal current, whereby movements of the needle due to thermal current will be in one direction, or on one side of the normal or zero position of the needle, and movements due to battery or galvanic current will be in the opposite direction and to the other side of zero or normal position; and in order that these movements by battery action may not be mistaken for a weakening of the thermal current, the strength of battery-current is made to exceed the greatest strength of thermal current developed in practice, so that, when active, such battery-current shall clearly preponderate and carry the needle promptly and by a positive movement to its side of zero position, and shall hold it there. Consequently movement on one side of zero is caused by thermal current and indicates safety or perfect insulation, and movement to the opposite side of zero, usually violent and uniformly sustained, is due to battery-current and indicates a fault in insulation. In order, however, to develop or cause an audible signal by such electrical means and connections that it can be given by the battery-current alone, and not by the thermal current, I employ a polarized relay and local bell-ringing circuit, and I connect the main battery in line with polarity in proper direction to move the armature against the stop for closed local circuit, whereby the bell will be rung in response to the action of the main battery, and the thermal current, being of opposite polarity, as before described, will, when not overpowered by the battery, hold the armature against the stop for open local circuit.

In the drawings I have illustrated electric apparatus and connections suitable for carrying out or applying my invention, in which—

A, Fig. 1, is a diagram designed to illustrate a lead-press for applying the lead covering to the wires. Such press may be of the usual or any suitable construction adapted to apply lead at comparatively high temperature and under pressure to the wires to form the cable. These presses are operated in manner similar to lead-pipe presses, applying the hot but solidified lead simultaneously to all the wires of the cable B, delivering the latter complete and ready to be wound in coils upon storing-reels C. The wires are passed to the machine from electrically-insulated reels, so as to prevent electric currents from finding ground-connection back of the machine. As a matter of convenience I connect the insulated conducting-wires $a$ of the cable to a line-wire, E', at or through the reel C, by passing the front end, $b$, of the cable through a hole in the head $c'$, and I secure the naked ends of wires $a$ in a binding-post, $c^2$, extending from metallic collar $c^3$, which latter is fitted tightly on the metallic shaft C' of the reel, whereby all rotate together, and continuous electric connection is made from the wires $a$ to the shaft. The body $c$ and heads $c'$ of the reel are made of non-conducting material, preferably of dry wood, whereby the lead covering of the cable will be insulated electrically from the shaft C' and wires $a$.

The reel may be mounted for rotary motion on any suitable insulating-supports, D, and rotary motion for winding the cable on the reel may be imparted in any desired manner by power or by hand.

In order to secure a good but easily detachable circuit-connection between shaft C' and line E', I make use of a metal hook, H, adapted to engage or rest upon the shaft between the collars $d\ d$. This hook is weighted below, as at $h$, to maintain it in upright position and hold its inner hook-surface in firm and uniform contact with the surface of the shaft, whereby good and uniform circuit-connection is made, with provision for removing the hook without trouble, when desired, for changing reels or other purposes. On the upper end of the hook is a binding-post, $h'$, in which the line E' is secured. This line is connected or passed through the helix or helices of a galvanometer, E, (see Figs. 1 and 4,) illustrated by diagram in Fig. 1. Such galvanometer may be of any known or suitable construction, having an index needle or finger, $e$, adapted to be moved over a graduated arc, $e'$, under electric impulse in its helix. Such instruments are well known in the art, and need not be described in detail. From the galvanometer E the line may pass directly to one pole of battery K. I prefer, however, to make provision for giving audible signal by means of this circuit, and to this end I employ a polarized relay, I, and connect the same by attaching the line E' to its binding-posts $i$ $i'$, and thence carry the line to one pole of battery K, the other pole being connected by line E² with ground E³. The press A, in which the cable is made, also has ground-connections, so that the battery-circuit has terminals in the insulated conductors for one pole and in the lead covering for the other pole. If a fault in insulation occurs, the battery-circuit will be completed, and the galvanometer and relay, or either, if but one be used, will be actuated. Having determined the polarity of the thermal current, which, in operation, takes the same circuit as the battery, the latter is connected in line with opposite polarity to the former, whereby the needle and armature will be moved in opposite directions by such currents, as before described. In practice the battery-current is made to preponderate over the thermal current, so as to control the movements of armature and needle when in action, whether the thermal current be strong or weak.

The polarized relay I may be of any suitable construction, having, for example, a pivoted armature, $n$, (see Figs. 1 and 4,) in which magnetic polarity is excited—say positive in the free end—by a permanent magnet, N, the two being connected or in close proximity, end to end. The opposite end of magnet N sustains similar relationship to the cores $n'$ of the coils or helices N', thereby exciting magnetic polarity in them—say negative in their ends adjacent to the armature. The helices N' are wound in the usual manner, so that an electric current will increase the core magnetism of one, and decrease or neutralize that of the other. Consequently, the battery and thermal currents being of opposite polarity, the former will move and hold the armature against one stop—as $m$, for example—and the latter, when not overpowered by the battery, will move and hold it against the other stop, $m'$. A local battery, F, is connected in circuit with the armature $n$ and stop $m$ of the relay by wires F' F", secured in the usual binding-posts, $i^2$ $i^3$, one of which has electrical connection with the armature and the other with the stop. A vibrating electric bell, R, (see Figs. 1 and 4,) is connected in this local circuit. Consequently the action of main battery K closes the local circuit through $m$ $n$, causing the bell to ring, while the thermal current, when battery K is inactive, opens the local circuit by holding armature $n$ upon stop $m'$. This bell R, as well as the relay I and galvanometer E, may be of any suitable construction, many such being in common use. In Fig. 4, I have illustrated these instruments of suitable form and construction for the purposes described, combined with a supporting stand or frame, S, whereby they are brought into convenient relative positions for use. The manner of connecting these instruments in their respective circuits will be readily understood without detail description. I do not wish, however, to limit my invention by the relative arrangement or construction of these instruments, as they may be varied as occasion may suggest.

By means of the combinations of devices and the method of testing the wires herein shown and described the disturbing element which has heretofore been the cause of trouble and uncertainty in testing the wires is eliminated or so disposed of as to become itself a proof of soundness in the cable, since the known existence of the thermal current manifested by the variable fluctuations of the galvanometer-needle on one side of zero is an indication more or less reliable that no material fault or defect in insulation has occurred, for if such fault did exist it would tend to short-circuit the thermal current and the needle would go toward zero. I prefer, however, to rely principally upon the more certain indications afforded by the two currents having opposite polarity, whereby they move the needle or other signal in opposite directions, the battery-current being the controlling one, as before described. Another advantage secured by this disposition of the thermal current is the reliable indication afforded by it of the temperature of the lead when applied to the wires—for, as before stated, the strength of this current varies with changes in temperature in the cable, so that by watching the movements of the needle due to thermal current, the workmen can tell with certainty whether or not they are applying the lead to the wires too hot for safety. Such indication of temperature is in practice of very great importance and utility, and it may be employed to advantage either with or without the presence of the controlling signal current. This method of testing the cable by means of an electric current or state generated or induced in the cable itself, as a result of the operation of applying the heated lead without the necessary use of a battery or other electric generator outside of the cable, I consider an important improvement in the art, and include the same as a part of my present invention.

For convenience I have referred to the controlling-current as galvanic, and have shown a battery for generating it; but I do not wish to limit my invention thereby, but include as an equivalent of such battery-current any kind or character of electric current, whether high or low tension, or from whatever source or by whatever means it may be excited or produced.

I make no claim herein to the reel and mechanical appliances for making circuit-connections shown and described, as the same, in so far as it may contain patentable invention, will form or be included in the subject-matter of another application for patent.

I claim as my invention—

1. The method herein described of testing lead-covered electric cables during the operation of applying the heated lead, by means of an electric current or electric condition produced or induced in the insulated conductors of the cable as a resultant of the lead-applying operation, substantially as set forth.

2. A system of apparatus for the testing of lead-covered electric cables without the necessary use of a battery or other electric generator other than that formed by the apparatus itself, such apparatus consisting of a lead-press and cable passing therefrom and receiving its lead coating therein, an electric connection between the insulated conductors and lead covering of the cable, and an electric signal in the line of such connection, combined substantially as and for the purposes set forth.

3. In combination with a lead-covered cable and press, an electric circuit connecting the insulated wires and lead covering of the cable, an electric signaling device, and a battery connected in such circuit, the battery-current having opposite polarity to the thermal current generated in applying the lead covering to the cable-wires by the press, substantially as and for the purposes set forth.

4. In combination with a lead-covered cable and press, an electric circuit connecting the wires and lead covering of the cable, a polarized relay and a battery connected in such circuit, the battery-current having opposite polarity to the thermal current passed over the circuit in the application of the lead covering by the press, and a local battery, bell, and circuit connected to the armature of the relay and to the stop against which the armature is moved by the main-battery current, substantially as and for the purposes set forth.

5. In combination with a lead-covered cable and press, an electric circuit connecting the wires and lead covering of the cable, a galvanometer polarized relay and battery connected in such circuit, the battery-current being of opposite polarity to the thermal current passed over the circuit in the application of the lead covering by the press, a local-battery circuit having terminals in the armature of the relay and the stop against which the armature is moved by the main battery, and an audible electric signaling device connected in the local circuit, substantially as and for the purpose described.

In testimony whereof I have hereunto set my hand.

WILLIAM J. McELROY.

Witnesses:
C. L. PARKER,
R. H. WHITTLESEY.